US 8,571,356 B2

(12) United States Patent
Nakada

(10) Patent No.: US 8,571,356 B2
(45) Date of Patent: Oct. 29, 2013

(54) IMAGE PROCESSING APPARATUS, IMAGE PROCESSING METHOD, AND IMAGE PROCESSING PROGRAM

(75) Inventor: Yuichi Nakada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 690 days.

(21) Appl. No.: 12/860,300

(22) Filed: Aug. 20, 2010

(65) Prior Publication Data

US 2011/0043649 A1     Feb. 24, 2011

(30) Foreign Application Priority Data

Aug. 24, 2009   (JP) ..................... PCT/JP2009/064716

(51) Int. Cl.
*G06K 9/32* (2006.01)
(52) U.S. Cl.
USPC ............ 382/299; 382/300; 382/236; 382/220
(58) Field of Classification Search
USPC .................................. 382/299, 300, 236, 220
See application file for complete search history.

(56) References Cited

U.S. PATENT DOCUMENTS

| 2008/0175435 | A1 | 7/2008 | Shiraishi et al. | |
| 2010/0067820 | A1 | 3/2010 | Yano | |
| 2010/0091131 | A1* | 4/2010 | Furukawa | 348/222.1 |

FOREIGN PATENT DOCUMENTS

| JP | 2006-033232 A | 2/2006 |
| JP | 2008-177641 A | 7/2008 |
| JP | 2008-293185 A | 12/2008 |
| JP | 2008-306651 A | 12/2008 |
| JP | 2009-048487 A | 3/2009 |
| WO | 2008-143360 A1 | 11/2008 |
| WO | 2008-153167 A1 | 12/2008 |
| WO | 2009/078437 | 6/2009 |

OTHER PUBLICATIONS

Shin Aoki, "Super Resolution Processing by Plural Number of Lower Resolution Images", Ricoh Technical Report No. 24, Nov. 1998.
Sung C.P., Min K.P., "Super-Resolution Image Reconstruction: A Technical Overview", IEEE Signal Proc. Magazine, vol. 26, No. 3, p. 21-36, 2003.
Shigeki Sugimoto, Masatoshi Okutomi, vol. 23, No. 3, p. 33-37.
Youichi Yaguchi, Masayuki Tanaka, Masatoshi Okutomi, vol. 2007, No. 42. p. 51-56.
Masato Toda, Masato Tsukada, Akira Inoue, IT2006 p. 63-64.

\* cited by examiner

*Primary Examiner* — Chan S Park
*Assistant Examiner* — Mark Roz
(74) *Attorney, Agent, or Firm* — Canon USA Inc. IP Division

(57) ABSTRACT

The present invention relates to generation of an appropriate high-resolution image with respect to a plurality of input images.
An image processing apparatus including a unit for acquiring a relative movement amount for each first image between a reference image selected from a plurality of first images and the first images; a unit for generating a fourth image having a first resolution for each first image in accordance with a third image having a second resolution, the relative movement amounts, and image capture characteristics of an image capture device; a unit for acquiring, for each fourth image, an evaluation value indicating a difference between the fourth image and the first image corresponding to the fourth image; and a unit for generating a second image having the second resolution by updating the third image using an update value that is determined using the fourth images in accordance with the evaluation values.

9 Claims, 13 Drawing Sheets

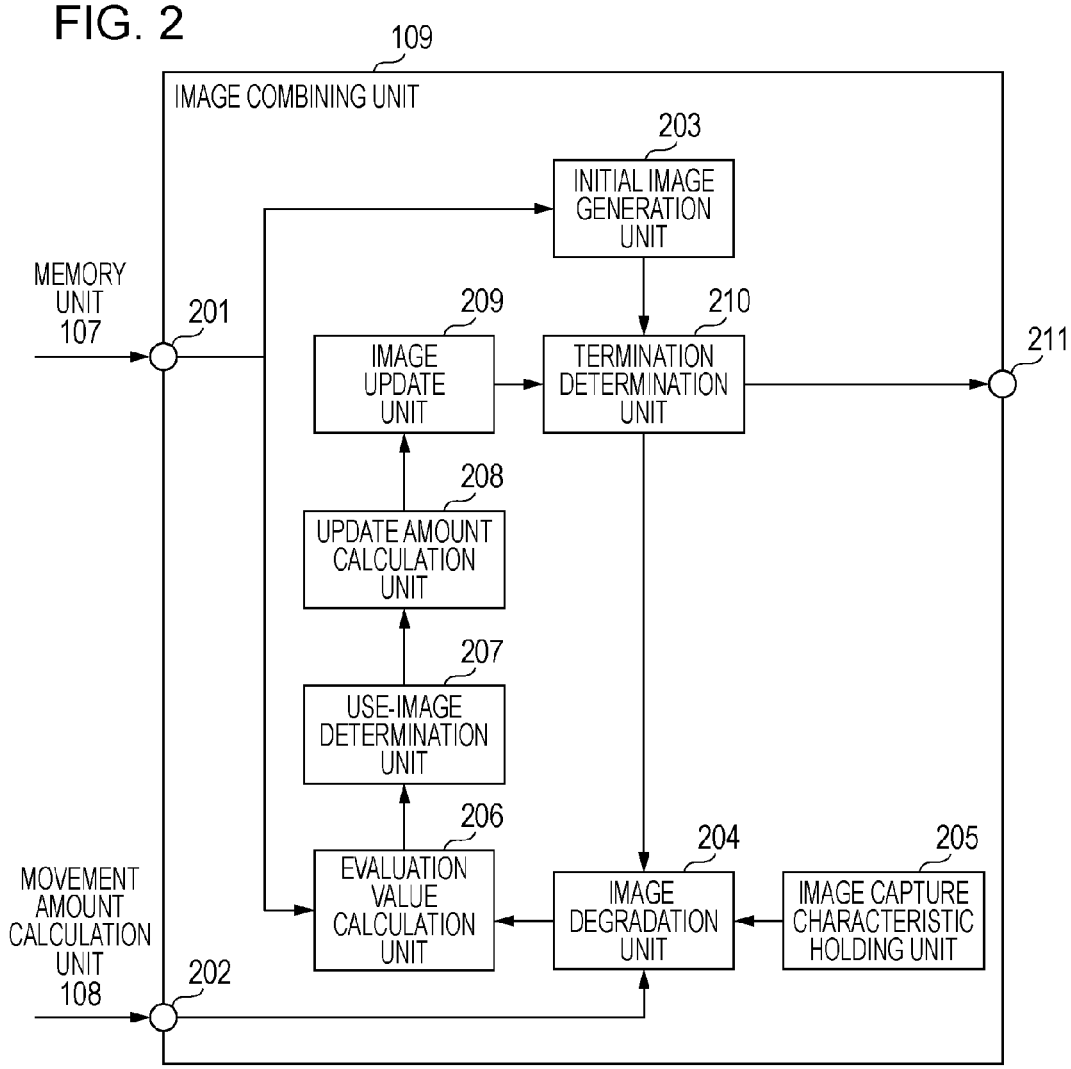

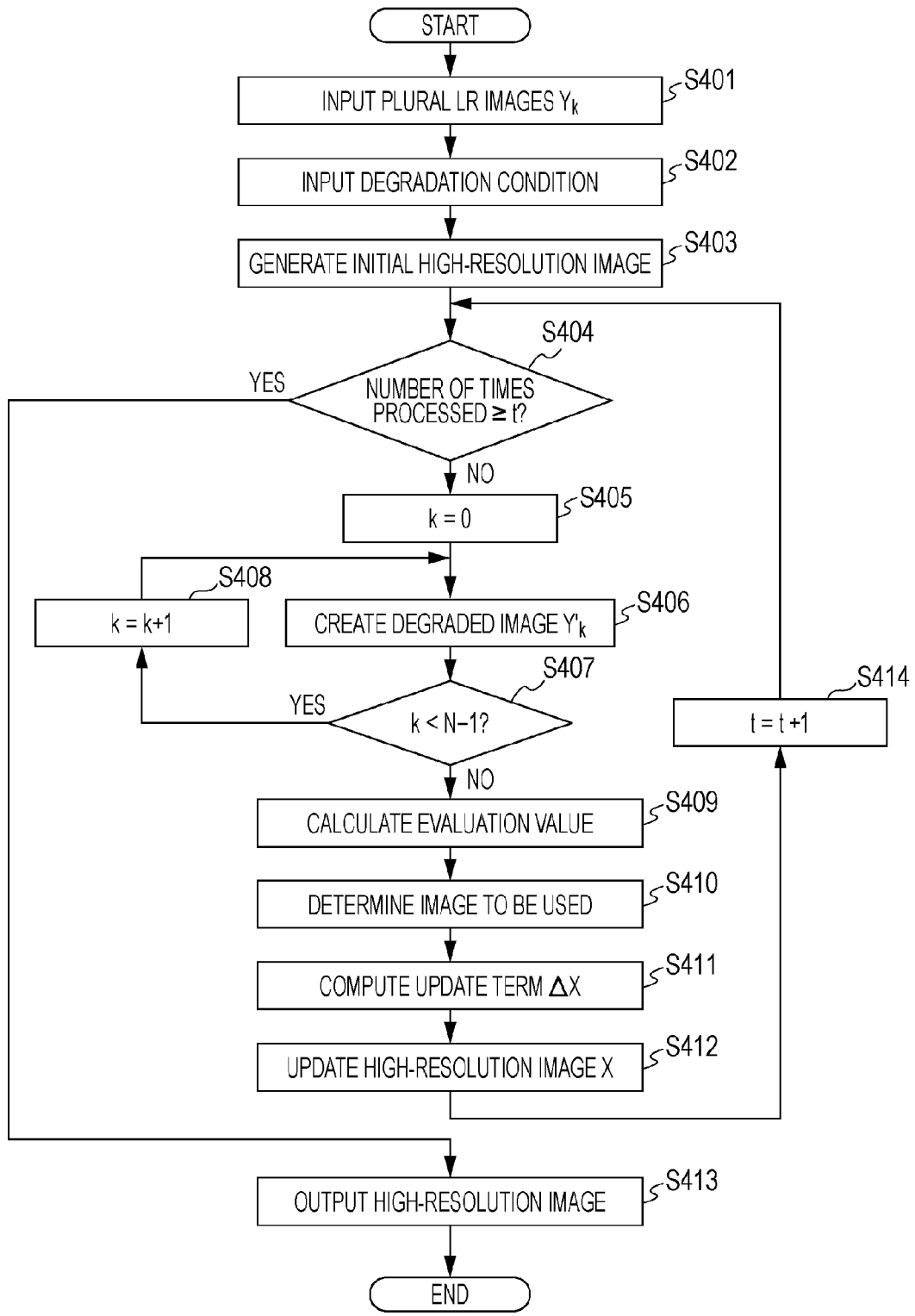

IMAGE PROCESSING APPARATUS, IMAGE PROCESSING METHOD, AND IMAGE PROCESSING PROGRAM

TECHNICAL FIELD

The present invention relates to an image processing apparatus, an image processing method, and an image processing program for generating a second image having a second resolution using a plurality of first images having a first resolution, which are captured using an image capture device.

BACKGROUND ART

The resolution of image data that can be captured using an image capture device such as a digital video camera is determined depending on the design or standard of the image capture device. However, a demand exists for acquiring image data of a high resolution over a resolution with which the image capture device can perform photographing. To meet such a demand, an image capture device that combines two or more pieces of image data to generate image data of a high resolution over the resolution with which the image capture device can perform image capture has been proposed. For example, in NPL 1, a technique for generating a high-resolution image by combining a plurality of low-resolution images having positional shifts is proposed. NPL 2 discloses a technique for generating a high-resolution image using a method based on MAP (Maximum A Posterior) estimation. MAP methods are methods for estimating a high-resolution image that minimizes an evaluation function obtained by adding probability information of a high-resolution image to a squared error. The methods provide estimation of a high-resolution image as the optimization problem which maximizes the a posteriori probability using certain a priori information about a high-resolution image. The above methods require images having positional shifts, which well resemble each other, as input low-resolution images to generate a high-resolution image.

CITATION LIST

Non Patent Literature

NPL 1 Shin AOKI, "Super Resolution Processing by Plural Number of Lower Resolution Images", Ricoh Technical Report No. 24, November, 1998

NPL 2 Sung C. P., Min K. P., "Super-Resolution Image Reconstruction: A Technical Overview", IEEE Signal Proc. Magazine, Vol. 26, No. 3, p. 21-36, 2003

In the methods proposed in NPL 1 and NPL 2, however, if a plurality of input low-resolution images include images with varying object instances (for example, changes in a person's expression, etc.), blurred images, and the like, an undesired difference occurs between a plurality of images. Thus, there has arisen a problem in that a desired high-resolution image cannot be generated. There has also arisen a problem in that a failed registration between input images does not allow generation of a desired high-resolution image.

Therefore, an object of the present invention is to generate an appropriate high-resolution image by combining a plurality of input low-resolution images to perform resolution conversion so that difficulties caused by images unsuitable for the combining process, which are included in the plurality of low-resolution image, can be eliminated or reduced.

SUMMARY OF INVENTION

In order to achieve the above object, an image processing apparatus according to the present invention has the following configuration. That is, an image processing apparatus that generates a second image having a second resolution using a plurality of first images having a first resolution, the first images being captured using an image capture device includes:

a first acquiring unit configured to acquire, for each of the first images, a plurality of relative movement amounts between a reference image selected from the plurality of first images and the first images;

a first generating unit configured to generate a plurality of fourth images having the first resolution for each of the first images in accordance with a third image having a second resolution, the plurality of relative movement amounts acquired by the first acquiring unit, and image capture characteristics of the image capture device;

a second acquiring unit configured to acquire, for each of the fourth images, a plurality of evaluation values based on differences between the plurality of fourth images generated by the first generating unit and the plurality of first images corresponding to the fourth images; and a second generating unit configured to generate the second image having the second resolution by updating the third image using an update value that is determined using the plurality of fourth images in accordance with the plurality of evaluation values acquired by the second acquiring unit.

Further features of the present invention will become apparent from the following description of exemplary embodiments with reference to the attached drawings.

BRIEF DESCRIPTION OF DRAWINGS

FIG. 2 is a block diagram illustrating the configuration of an image combining unit 109.

FIG. 3 is a diagram illustrating matrices representing the degradation stage.

FIG. 4 is a flowchart illustrating a flow of an image combining process.

Figure 1:
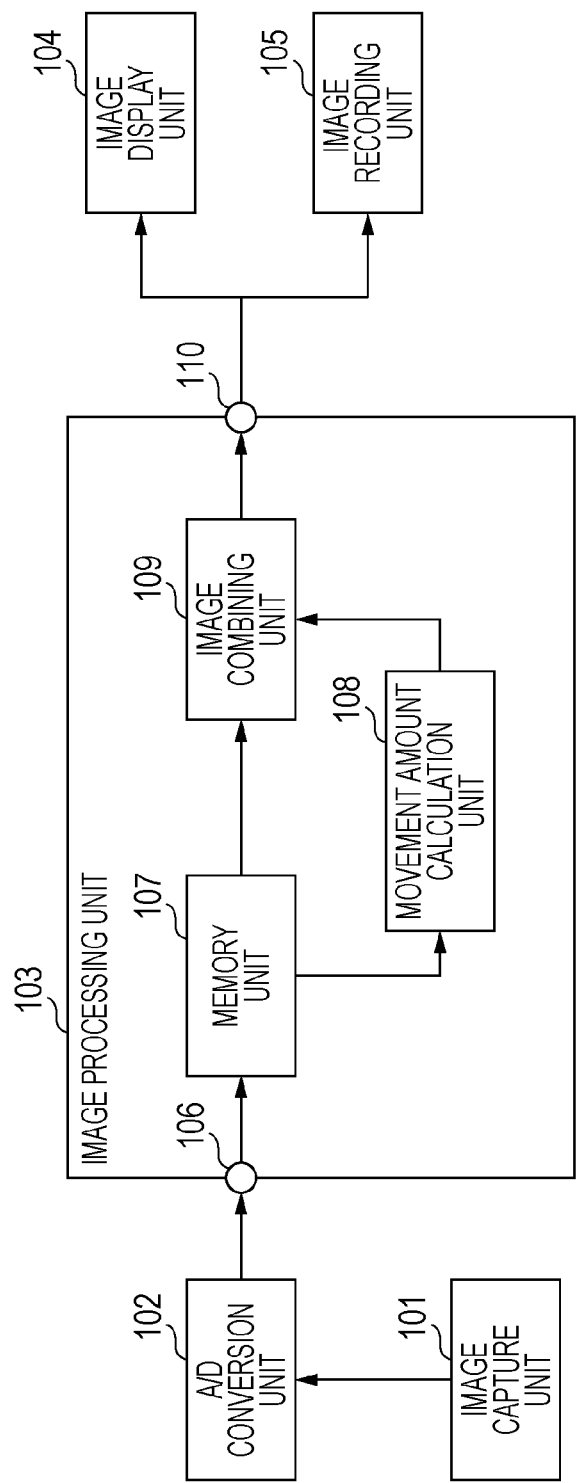
FIG. 1 is a block diagram illustrating the configuration of an image processing apparatus of Exemplary Embodiment 1.

DESCRIPTION OF EMBODIMENTS (Exemplary Embodiment 1)
<Configuration Diagram of Image Processing Apparatus>
FIG. 1 is a block diagram illustrating the configuration of an image processing apparatus of Exemplary Embodiment 1. An image capture unit 101 includes an image pickup lens group, and a semiconductor image pickup element such as a C-MOS or CCD. A video signal output from the image capture unit 101 is converted into a digital image by an A/D conversion unit 102, and is input to an image processing unit 103. The image processing unit 103 performs a resolution conversion process on the input image, and generates an image of a higher resolution than the resolution of the input image. The generated high-resolution image is displayed on an image display unit 104 or is recorded on a recording medium using an image recording unit 105.

The process of the image processing unit 103 will be described. An input terminal 106 is an input terminal of the image processing unit 103 to which the digital image converted by the A/D conversion unit 102 is input. The input image is stored in a memory unit 107. 108 denotes a movement amount calculation unit that reads a plurality of images from the memory unit 107 and that calculates relative movement amounts between the image. Specifically, one reference image is selected from among the plurality of read images, and a relative movement amount between the selected image and each of all the read images is calculated. Next, an image combining unit 109 combines the plurality of images read from the memory unit 107 using the relative movement amounts obtained from the movement amount calculation unit 108, and generates a high-resolution image. The details of the image combining unit 109 will be described in detail below. Finally, the generated high-resolution image is output from an output terminal 110, and the process of the image processing unit 103 is completed. Each processing unit (the image processing unit 103 or the image display unit 104) is controlled by a central processing unit (CPU).

The image processing apparatus is a computer that executes image processing, an image capture device (still image camera, moving image camera) having an image display interface, a display device such as a television set, or a printing device such as a printer.

<Details of Image Combining Unit>
FIG. 2 is a block diagram describing the image combining unit 109. In the exemplary embodiment, an output high-resolution image is represented by an HR image (High Resolution image), and input images are represented by LR images (Low Resolution images). The plurality of LR images stored in the memory unit 107 are input to the image combining unit 109 through an image input terminal 201. The relative movement amounts output from the movement amount calculation unit 108 are input to the image combining unit 109 through a relative movement amount input terminal 202. An initial image generation unit 203 generates an initial HR image (X0) as an initial image of an output HR image on the basis of one LR image selected from among the plurality of LR images. Preferably, the selected LR image is the same as a reference image (which will be described in detail below) used as a reference for calculating the relative movement amounts using the movement amount calculation unit 108. An image degradation unit 204 generates a degraded image by degrading the initial HR image (X0) generated by the initial image generation unit 203 or an HR image generated by an image update unit 209 on the basis of image capture characteristics obtained from an image capture characteristic holding unit 205 and the relative movement amounts obtained from the relative movement amount input terminal 202. Degradation conditions used in Exemplary Embodiment 1 are the point spread function (PSF) indicating the characteristics of the optical system in the image capture device, the down-sampling factor limited by the number of sensor pixels, and the relative movement amounts. It is assumed that the degradation conditions of the down-sampling factor are obtained from the down-sampling reduction factors (1/sx, 1/sy). In this regard, sx and sy are assumed to be positive numbers. Further, it is assumed that these degradation conditions are defined in advance prior to combination of images. An evaluation value calculation unit 206 calculates an evaluation value of each LR image for determining whether or not the LR image is used in the image combining process using the LR images input from the image input terminal 201 and the degraded images input from the image degradation unit 204. A use-image determination unit 207 determines, based on the evaluation values of the LR images calculated by the evaluation value calculation unit 206, whether or not each of the LR images is used in the combining process. The evaluation value calculation method and determination method will be described below. An update amount calculation unit 208 calculates an update amount by which an HR image is updated. The image update unit 209 updates an HR image using the update amount obtained from the update amount calculation unit 208. Specifically, in order to estimate one HR image from among a plurality of LR images using the image combining process described below, an update amount indicating the amount of change of the pixel value for each pixel of the HR image is calculated. Therefore, the resolution in the update amount is the same as the resolution of the HR image. The HR image is updated by multiplying the update amount by a parameter indicating the level of update and adding the result to the HR image. A termination determination unit 210 determines whether or not the process for updating the HR image generated by the initial image generation unit 203 or the image update unit 209 is terminated. In Exemplary Embodiment 1, termination determination is performed based on the number of updates in the update process. Specifically, a threshold value t is set in advance, and the update process is terminated when the number of times the update process has been performed is greater than or equal to t. When the update process is terminated, the HR image is output to an output terminal 211. When the update process is not terminated, the updated HR image is output to the image degradation unit 204, and the HR image update process is continued.

<Degradation Condition>
A description will be given of the case where the degradation conditions of the image capture device are the point spread function (PSF) of the image capture device, down-sampling that is in the degradation stage due to the limitation of the number of sensor pixels, and positional shift (relative movement amount). In the exemplary embodiment, the point spread function (PSF) of the image capture device and the conditions of the down-sampling factor are referred to as image capture characteristics. If an LR image that is captured is represented by Y, then the degradation conditions act as defined in (Math. 1).

$$Y = DBM \cdot X \quad \text{(Math. 1)}$$

A matrix B is a square matrix indicating the degradation stage based on PSF. A matrix D is a matrix reflecting the image reduction factors in a down-sampling process. M denotes a matrix representing relative movement amounts between images. X denotes an HR image. (Math. 1) indicates that a degraded image (Y) is acquired by applying the point spread characteristics of the image capture device, down-sampling by the image pickup element, and positional shifts between input LR images to a high-resolution image.

The sizes of the matrices M, B, and D change depending on the size of the LR image. When the size of an LR image is measured by W (the number of lateral pixels) and H (the number of longitudinal pixels) and the image reduction factors during down-sampling are (1/sx, 1/sy), the sizes of the matrices given in (Math. 1) are those in FIG. 3. Since the HR image, or X, is handled as being represented as a vector, its matrix size is given by (H×W)×1. The matrix M representing relative movement amounts between images and the matrix B for performing the degradation process based on PSF are square matrices of (H×W)×(H×W). The size of the matrix D representing the down-sampling process is given by (H×1/sx×W×1/sy)×(H×W).

A method for generating the matrix M representing relative movement amounts will be described. The matrix M is created based on the determination of an affine parameter indicating the relative relationship between a reference image and the image of interest, which is obtained by the calculation of a relative movement amount described below. One of a plurality of input images is determined as a reference image, and each of the other images is set as the image of interests. In this case, the pixel position (x, y) corresponds to the pixel position on the image of interest, and the pixel position (x', y') corresponds to the pixel position on the reference image. Based on the estimated affine parameter, it can be determined which coordinate position on the reference image the pixel position (x, y) on the image of interest corresponds to. As a result of the correspondence, if the pixel position (x', y') is plotted at the grid point on the reference image, the element in the matrix M corresponding to the pixel position of the reference image is defined as 1, and 0 is substituted into the other elements. If the pixel position is not plotted at the grid point on the reference image, the coefficient of the matrix M is calculated from the pixel values of neighboring pixels of (x', y'), using an interpolation process such as linear interpolation, based on their weights. In this case, weight values assigned to the neighboring pixels of (x', y') are substituted into the row and column elements of the matrix M, which are determined based on the positions of the neighboring pixels of (x, y) and (x', y'). Substituting 0 into the other elements yields a matrix M representing relative movement amounts between images. A technique for calculating relative movement amounts on a block-by-block basis will be described below.

<Image Combining Process>

The image combining process in Exemplary Embodiment 1 is performed based on the MAP estimation method disclosed in NPL 2. The MAP estimation method is a method for estimating a high-resolution image by minimizing an evaluation function obtained by adding probability information of the high-resolution image to a squared error. The method is a super-resolution processing method for estimating a high-resolution image as the optimization problem which maximizes the a posteriori probability using certain a priori information about the high-resolution image. In Exemplary Embodiment 1, an HR image is estimated from a plurality of LR images in accordance with (Math. 2).

$$X = \operatorname{argmin}\left[\alpha\|CX\|^2 + \sum_k \frac{1}{\sigma_k^2}\|Y_k - DBM_k X\|^2\right] \quad \text{(Math. 2)}$$

where X denotes an estimated HR image, X denotes an initial HR image X0 described below or an HR image in repetitive operation of the MAP method, $Y_k$ denotes an LR image, and C denotes a linear filter that is applied to the estimated HR image. Further, k denotes the index (serial number) of each LR image.

In (Math. 2), $$\|CX\|^2$$

is a constraint term in which a priori information that "adjacent pixels often have similar pixel values" is taken into account. In Exemplary Embodiment 1, a Laplacian filter having the smoothing effect over an entire image is used as the linear filter C. α is a parameter for adjusting the level of smoothing in a resulting image. In order to obtain a resulting image with a high level of smoothing, it is effective to increase the value of α.

In (Math. 2), $$\frac{1}{\sigma_k^2}\|Y_k - DBM_k X\|^2$$

is a term for computing a difference value between the LR image $Y_k$ and a degraded image that is estimated through the degradation stage. This difference represents accuracy of estimation of an HR image of (Math. 1). If the estimation of (Math. 1) is accurate, this term equals zero. In this regard, $\sigma_k$ is the standard deviation of the amount of noise in the input image $Y_k$.

(Math. 3) is a formula in which the right side of (Math. 2) is extracted and is used as the evaluation function during image combining I.

$$I = \alpha\|CX\|^2 + \sum_k \frac{1}{\sigma_k^2}\|Y_k - DBM_k X\|^2 \quad \text{(Math. 3)}$$

As described below, a high-resolution image is updated using the derivative value of the evaluation function as an update value.

An image combining method performed by the image combining unit 109 will be described using a flowchart of FIG. 4. First, a plurality of LR images $Y_k$ are input from the memory unit 107 through the image input terminal 201 (step S401). Here, it is assumed that N LR images $Y_k$ are input. k is a counter (index) for counting the number of input LR images $Y_k$, and the variation range of k is k=[0, 1, . . . , N−1].

Next, the degradation conditions of the image capture device are acquired (step S402). Degradation conditions used in Exemplary Embodiment 1 are the point spread function (PSF) of the optical system in the image capture device, the down-sampling factor that is in the degradation stage due to the limitation of the number of sensor pixels, and positional shifts (relative movement amounts) between images.

In step S403, an initial HR image X0 required in MAP estimation described above is created. The initial HR image X0 is one in which the horizontal image size is magnified to sx times and the vertical image size is magnified to sy times that of one LR image selected from among the input LR images $Y_k$ using the interpolation process. Linear interpolation is used as the interpolation process (any other interpolation process such as cubic interpolation may also be used).

Subsequently, in step S404, it is determined whether or not the process is terminated. In Exemplary Embodiment 1, the determination as to whether or not the process is terminated is performed based on the number of times processed in the HR image update process. A threshold value t set in advance is used. When the number of times processed is smaller than t, the process for updating the HR image X is continued. When the number of times processed is greater than or equal to t, the process proceeds to step S413.

The description will be further given of the case where the process is continued in S404. Subsequently, in step S405, the counter k is initialized to k=0. Then, degraded images $Y'_k$ individually corresponding to the LR images $Y_k$ are created based on the HR image while the input degradation conditions are taken into account (step S406). The degraded images are created by performing the following calculation using (Math. 1).

$$Y'_k = DBM_k \cdot X \qquad \text{(Math. 4)}$$

Mk is a relative movement amount for $Y_k$. It is determined whether or not degraded images $Y'_k$ have been generated for all the input LR images $Y_k$ (step S407). If it is determined that the generation of degraded images $Y'_k$ for all the LR images has not been completed, the value of the counter k is updated (step S408), and the processing of steps S406 to S407 is repeatedly performed. On the other hand, if it is determined in step S407 that the generation of degraded images $Y'_k$ for all the LR images $Y_k$ has been completed, evaluation values ek for determining whether or not the LR images $Y_k$ is used are calculated using the generated degraded images $Y'_k$ (step S409). The evaluation values ek are computed using the difference between the LR images $Y_k$ and the degraded images $Y'_k$. In Exemplary Embodiment 1, it is assumed that an evaluation value is computed for each $Y_k \cdot Y'_k$ using (Math. 5).

$$e_k = \|Y_k - Y'_k\|^2 \qquad \text{(Math. 5)}$$

The evaluation value ek is represented as the sum of squares of difference images between LR images $Y_k$ and degraded images $Y'_k$ (a matrix norm of difference images). The larger the difference between the LR image $Y_k$ and the degraded image $Y'_k$ is, the larger the value is.

Figure 5:
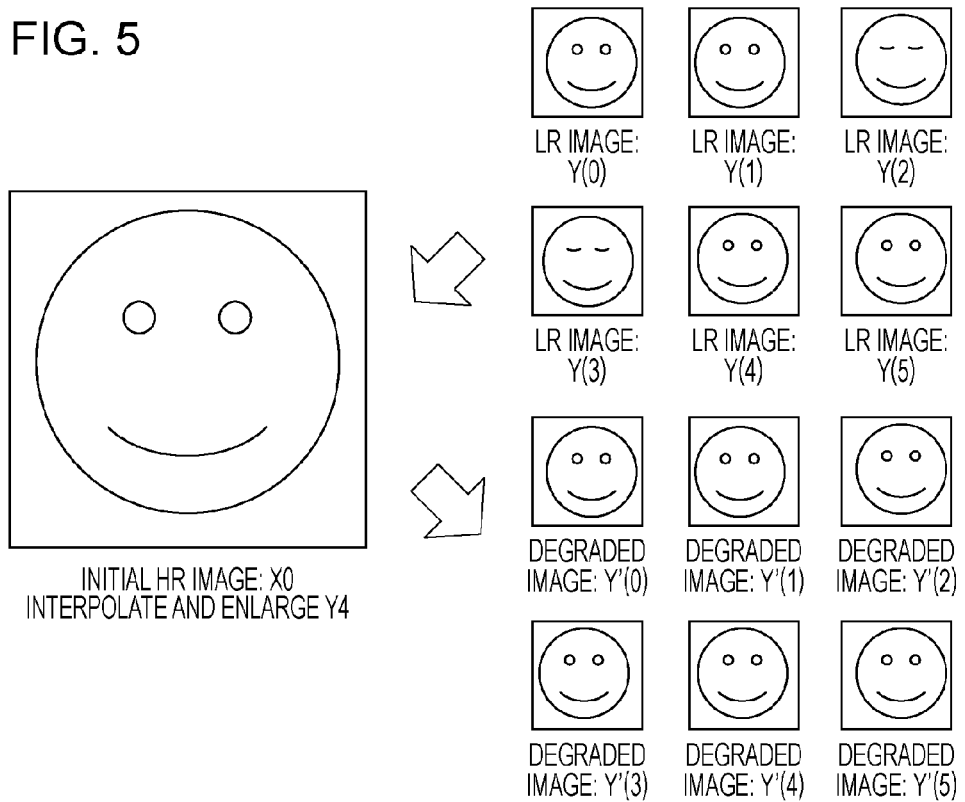
FIG. 5 is a diagram illustrating low-resolution images and corresponding degraded images.

Here, the description will be given of which LR image $Y_k$ is an image having large ek using FIG. 5 with respect to the case where the initial HR image X0 is handled as an HR image, by way of example. FIG. 5 illustrates six LR images (Y0 to Y5) and an initial HR image X0 that is generated by interpolating and enlarging the LR image Y4 selected from Y0 to Y5. Y0 to Y5 are a plurality of continuously shot LR images, and the object's expression changes over the images. The object's eyes are open in the four LR images including the LR image Y4 (Y0, Y1, Y4, Y5) while the eyes are closed in the other two images (Y2, Y3). A degraded image $Y'_k$ corresponding to each LR image is generated by taking the degradation conditions input for the HR image into account. Since the degradation conditions do not include changes in an object's expression, the degraded images Y'2 and Y'3 corresponding to the Y2 and Y3, which have a different object's expression from the HR image, are images with both eyes open (images with an intermediate level between an image with both eyes open and an image with both eyes closed). For this reason, when the evaluation values ek are calculated, the evaluation values of the Y2 and Y3 are larger than those of the other LR images because of the change in the expression.

Figure 6:
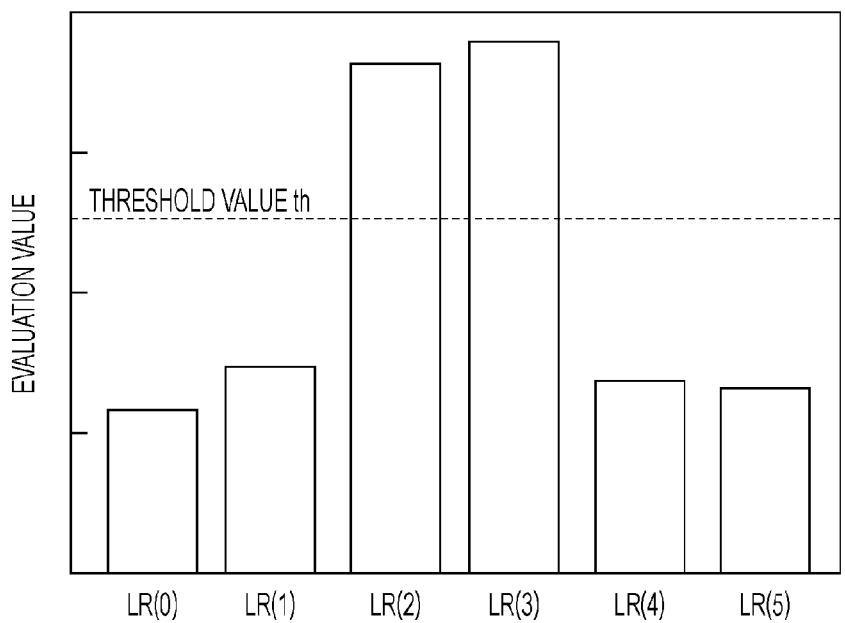
FIG. 6 is a diagram illustrating an example of evaluation values calculated by an evaluation value calculation unit.

In step S410, it is determined for each $Y_k$, based on the evaluation values ek calculated in step S409, whether or not the LR images $Y_k$ is used in the combining process. In this process, LR images $Y_k$ to be used in the combining process are selected. Specifically, a threshold process (a process based on comparison with the threshold value th) is performed on ek using the threshold value th. It is assumed that if ek is greater than or equal to the threshold value th, it is determined that the corresponding LR image $Y_k$ is not used in the combining process. In Exemplary Embodiment 1, it is assumed that the threshold value th is set in advance. FIG. 6 is a diagram illustrating an example of evaluation values calculated by the evaluation value calculation unit 206. In this case, the evaluation values for LR(2) and LR(3) exceed the threshold value th, and these images are not used in the combining process.

The reason why LR images having high evaluation values ek are not used in the combining process is as follows. It is assumed that an HR image has been estimated by performing the method given below on Y4 (image with both eyes open) selected as the initial HR image X0 in FIG. 5 using the LR image Y2 (image with both eyes closed). In this case, the estimated HR image has been estimated from both the image with both eyes open and the image with both eyes closed, and is consequently an image with the eye portion blurred. In the exemplary embodiment, Y2 and Y3 are not used intentionally in the combining process in order to avoid such a problem.

While in the foregoing description, Y4 is used as the initial HR image X0, Y2 (or Y3) can also be used as the initial HR image X0. However, if Y4 is used as the initial HR image X0, it is possible to generate an HR image based on four LR images while if Y2 is used as the initial HR image X0, an HR image is generated based on two LR images. In order to improve the accuracy of estimation of the HR image X in (Math. 1), it is preferable that an HR image be generated based on a larger number of LR images. Therefore, Y4 being used as the initial HR image X0 is more desirable than Y2 being used as the initial HR image X0.

Figure 15:
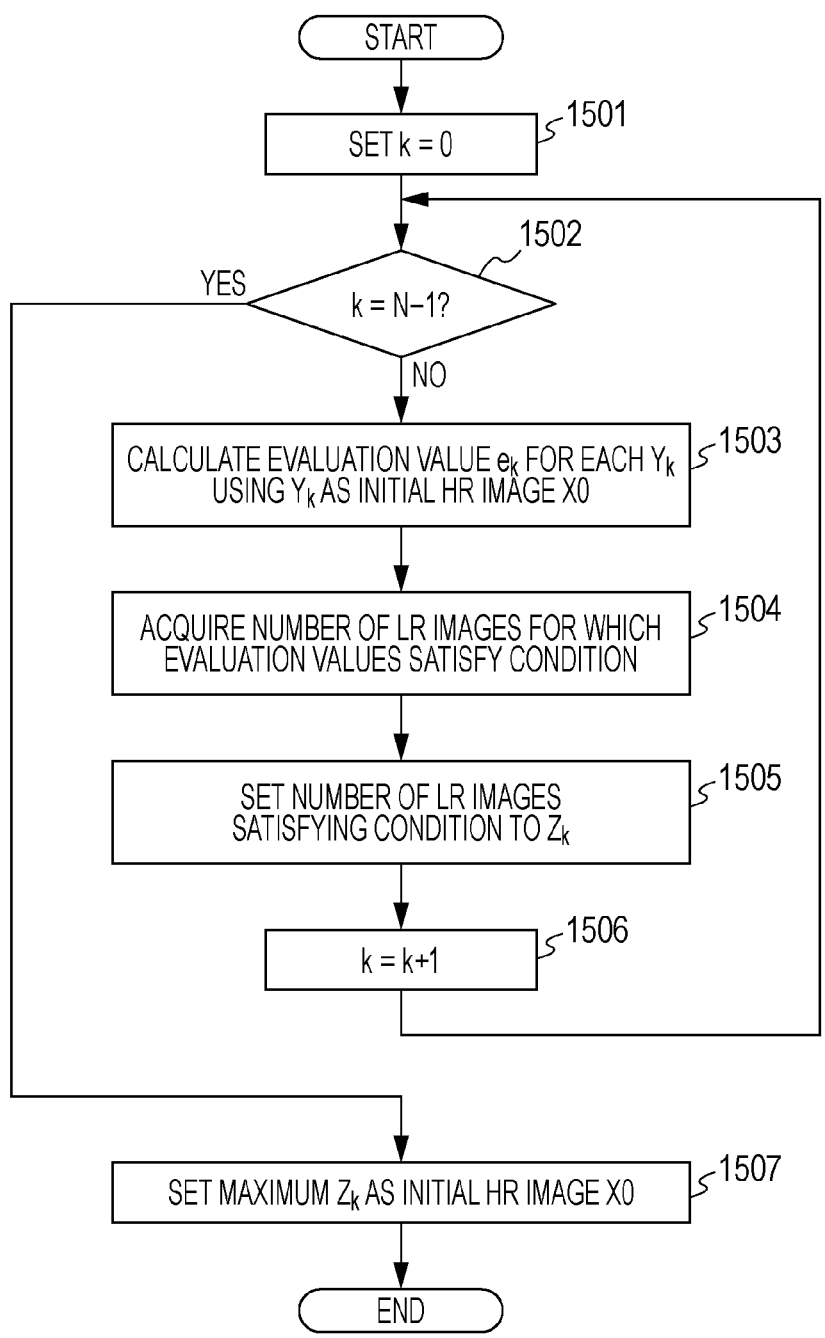
FIG. 15 is a flowchart describing a method for selecting an initial XR image X0.

From the above discussion, when the initial HR image X0 is selected, it is preferable that the "most representative" image be selected. For example, preferably, the initial HR image X0 is selected by acquiring, for each LR image, in advance how many LR images among the other LR images have satisfactory evaluation values. FIG. 15 is a flowchart describing a method for selecting the initial XR image X0.

In step S1501, k is set to 0. In step S1502, it is determined whether or not k is equal to N−1. As described above, k denotes the index of an LR image and N denotes the number of LR images. In step S1503, the evaluation value ek for each $Y_k$ is calculated based on (Math. 4) and (Math. 5) using the $Y_k$ as the initial HR image X0. In step S1504, the number of LR images for which the evaluation values satisfy the condition is acquired. In step S1505, the number of LR images satisfying the condition is set as Zk. In step S1506, k is incremented by 1.

The processing of steps S1503 to S1506 is performed repeatedly a number of times corresponding to the number of LR images. If the condition k=N−1 is satisfied in step S1502, the process proceeds to step S1507, and the maximum value among the obtained Zk is set as the initial HR image X0. In general, the more the LR images are used in the combining process, the more appropriate a high-resolution image can be obtained. Therefore, the number of LR images used in the combining process can be optimized (maximized) by selecting the initial HR image X0 in accordance with the flowchart illustrated in FIG. 15. In step S411, an HR image update process is performed based on only the LR images that are determined in step S410 to be used in the combining process.

The update term ΔX (update value) required to reduce the difference value between an LR image $Y_k$ and a degraded image $Y'_k$ is computed using (Math. 6) obtained by differentiating (Math. 3) with X.

$$\Delta X = \frac{\partial I}{\partial X} = 2\alpha C^T C X - \sum_i \frac{2}{\sigma_k^2}(DBM_k)^T \begin{bmatrix} Y_i - \\ DBM_i X \end{bmatrix} \quad \text{(Math. 6)}$$

As described above, the second term of (Math. 6) is the term indicating the difference value between the LR image and the degraded image. This difference value represents accuracy of estimation of an HR image of (Math. 1). If the estimation of (Math. 1) is accurate, this term equals zero. $\sigma_k$ is the standard deviation of the amount of noise in the input image $Y_k$. If the update term is determined using only the difference value of (Math. 1), in particular, the edge portion of the image looks noticeably unnatural. This portion is compensated using the constraint term in the first term in which the a priori information that "adjacent pixels often have similar pixel values" is taken into account. In Exemplary Embodiment 1, a Laplacian filter having the smoothing effect over an entire mage is used as the linear filter C. α is a parameter for adjusting the level of smoothing in a resulting image. In order to obtain a resulting image with a high level of smoothing, it is effective to increase the value of α.

When the calculation of the update term ΔX is completed, in step S412, the HR image X is updated using (Math. 7).

$$X \leftarrow X + \eta \Delta X$$

where η denotes a parameter for determining the width of update. An increase of η accelerates the convergence to an optimum HR image. On the other hand, if η is excessively increased more than necessary, the amount of overshoot may be too large and more time may be required for convergence. Therefore, an optimum η may be determined based on the condition (the number of times processed) used in step S404 or based on user setting.

When the creation of an updated image is completed, the processing of steps S404 to S412 is repeatedly performed until the condition (the number of times processed>=t) defined in step S404 is satisfied. Finally, in step S413, a combined image (that is, the high-resolution image X that has been updated t times) is output, and the combining process for the plurality of input LR images $Y_k$ is completed.

In the above example, when evaluation values are calculated in step S409, the evaluation values ek are calculated using all the LR images $Y_k$ and all the degraded images $Y'_k$. However, evaluation values can also be acquired using weights based on the level of importance (level of interest) of the pixels in the image.

Figure 14A:
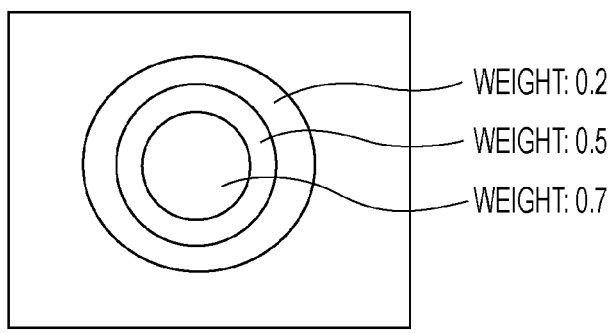
FIGS. 14A and 14B are diagrams illustrating weighted regions for acquiring evaluation values.
Figure 14B:
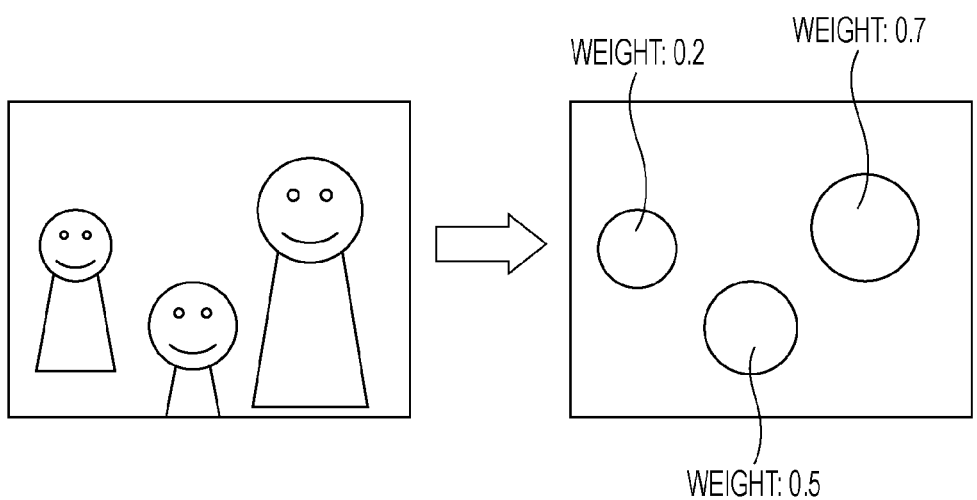

FIGS. 14A and 14B are diagrams illustrating weighted regions for acquiring evaluation values.

In the illustration of FIG. 14A, weights are large for a region (block, pixel) located at the center of an image, and the nearer the approach to the borders is, the smaller the weight is.

FIG. 14B illustrates weights assigned to regions (blocks, pixels) specified using techniques such as face recognition, person recognition, and object recognition. In the illustration, an increase in the weight assigned to a specific person relatively reduces the effect of the evaluation values of the other regions. When an input image $Y_k$ and a degraded image $Y'_k$ have regions Rki and R'ki (i denotes the number indicating a region in the image and N denotes the number of regions), respectively, the evaluation value is determined as follows.

$$e_k = \sum_i^N w_i \|R_{ki} - R'_{ki}\|^2 \quad \text{(Math. 8)}$$

where wi denotes the weight of each region.

In this manner, weighting in accordance with the region of interest in an image (for example, the center of the image or a person region) avoids the problem in that due to the large evaluation value ek because of the reasons such as:

Large movement in a border portion of an unimportant image, and

Movement in the background although the object of interest is a person, an appropriate evaluation process cannot be performed.

<Calculation of Relative Movement Amount>

Figure 7:
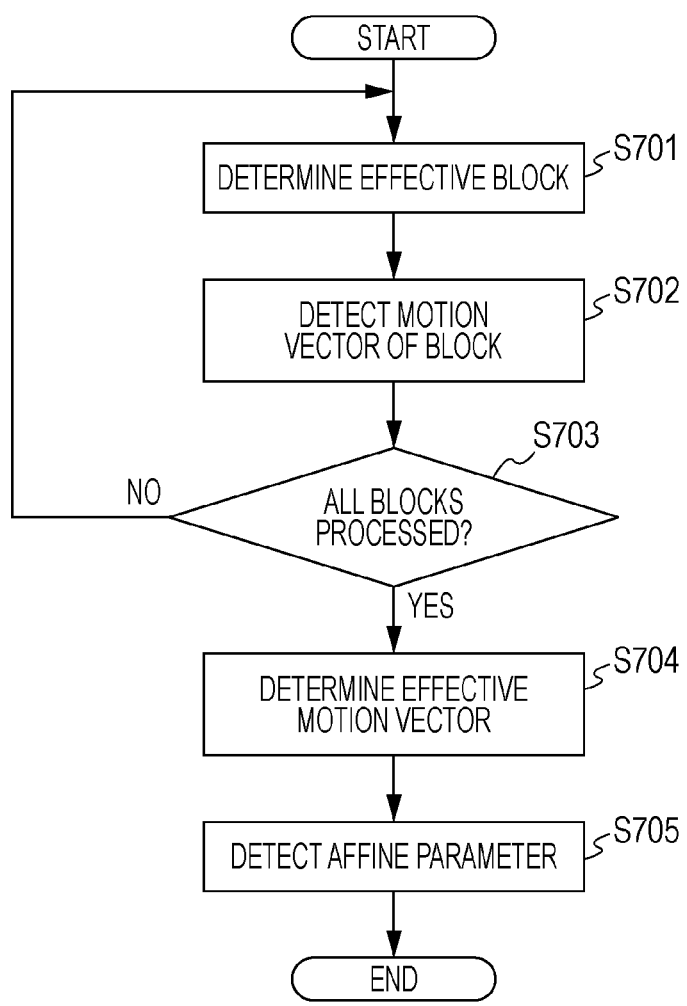
FIG. 7 is a flowchart describing a method for determining a relative movement amount between frames.

FIG. 7 is a flowchart describing a method for determining a relative movement amount between frames, which is performed by the movement amount calculation unit 108. Here, a method in which a motion vector is determined for each block and in which the amount of movement in the entire screen is determined as an affine parameter will be described. The effective block determination of step S701 is performed as pre-processing when a motion vector is determined for each block. This is a process for removing a block for which a correct motion vector cannot possibly be determined. The details will be described below. In step S702, the motion vector of the block is calculated. Here, a general block matching method will be described. In the block matching method, the sum of squared differences or the sum of absolute differences between pixels in a block is used as the evaluation value of matching. Evaluation values are determined while the block of interest for which the vector is determined is sequentially moved in a search range within the reference image. The position having the minimum evaluation value among all the evaluation values determined in the search range is a position that exhibits the highest correlation with the block of interest, and the amount of movement thereat is a motion vector. A method for determining the search range on a pixel-by-pixel basis is referred to as full search. In contrast, a method for determining a minimum evaluation value within some portions of the search range and then performing fine search in the vicinity thereof is referred to as step search. Step search is well known as a method for providing quick determination of motion vector. Then, in step S704, effective motion vector determination is performed. This is a process for removing a motion vector that is not correct as a result of calculation among the determined motion vectors. The details will be described below. In step S703, termination determination is performed. When all the blocks have been processed, then in step S705, an affine parameter is detected from among the effective motion vectors.

Next, the details of affine parameter detection will be described. If the center coordinates of the block of interest are (x, y) and the center coordinates of the block in the reference image have moved to (x', y') as a result of calculation of the motion vector, the above relationship can be represented as (Math. 9).

$$\begin{pmatrix} x' \\ y' \\ 1 \end{pmatrix} = \begin{pmatrix} a & b & c \\ d & e & f \\ 0 & 0 & 1 \end{pmatrix} \cdot \begin{pmatrix} x \\ y \\ 1 \end{pmatrix} \quad \text{(Math. 9)}$$

Here, a 3×3 matrix is an affine transform matrix. Each element of the matrix is an affine parameter. When a=1, b=0, d=0, and e=1, this transform is translation, where c denotes the amount of horizontal movement and f denotes the amount of vertical movement. Further, the rotational movement with a rotation angle θ can be represented by a=cos θ, b=−sine θ, d=sin θ, and e=cos θ. (Math. 9) can be expressed as (Math. 10) in form of generalized matrix.

$$x'=A\cdot x \quad \text{(Math. 10)}$$

Here, x and x' denote 1×3 matrices, and A denotes a 3×3 matrix. When n effective motion vectors are obtained, as in (Math. 11), the coordinate value of the image of interest can be expressed using an n×3 matrix.

$$X=(x_1\ x_2 \ldots x_n) \quad \text{(Math. 11)}$$

Similarly, the coordinate value after movement can also be expressed using an n×3 matrix as in (Math. 12).

$$X'=(x'_1\ x'_2 \ldots x'_n) \quad \text{(Math. 12)}$$

Therefore, the expression given by (Math. 13) is obtained for n motion vectors.

$$X'=A\cdot X \quad \text{(Math. 13)}$$

That is, if the affine matrix A in (Math. 13) is determined, this represents the amount of positional shift in the entire screen. If (Math. 13) is modified, then the affine matrix is determined as given by (Math. 14).

$$A=X'\cdot X^T\cdot (X\cdot X)^{T-1} \quad \text{(Math. 14)}$$

Since an amount of movement can be expressed using affine transform parameters, this method can support roll blurring in the in-plane direction, zoom blurring in the forward/backward direction, and the like as well as shift blurring which is caused when the camera is held.

Figure 8:
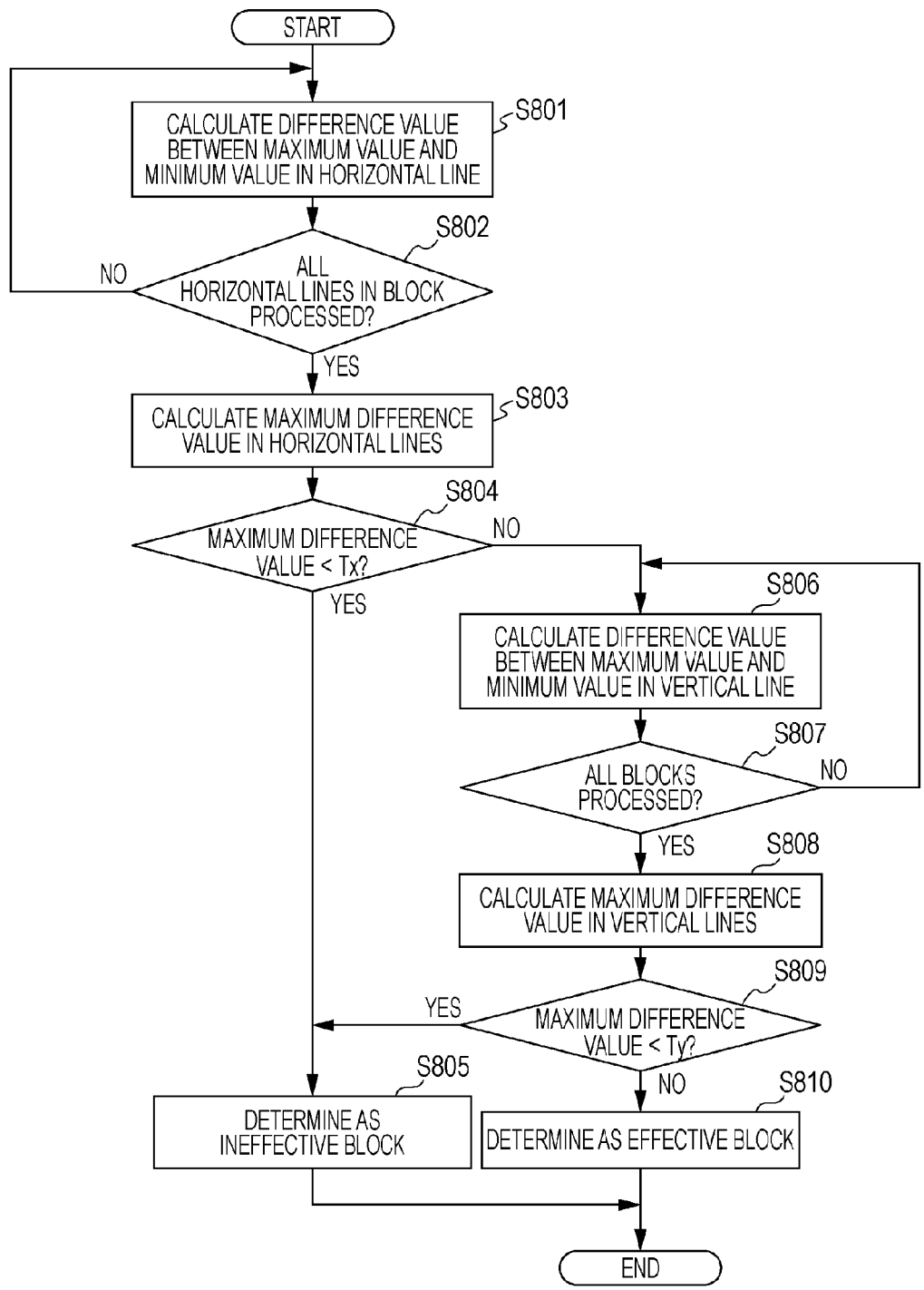
FIG. 8 is a flowchart describing an effective block determination method.

Here, the effective block determination method will be described using a flowchart of FIG. 8. When the correlation between blocks is to be determined using block matching, an image within a block needs to have a certain feature value. In a flat block including substantially only the direct-current component, a correct motion vector cannot be determined. Conversely, if edges are included in the horizontal direction or in the vertical direction, it is conceived that matching is easily taken. FIG. 8 illustrates a technique for removing such a flat block. Here, the description will be given in the context of the process performed on one block.

First, in step S801, a difference value between a maximum value and a minimum value for one horizontal line within a block is calculated. For example, if the size of the block is configured using 50×50 pixels, a maximum value and a minimum value are determined from 50 pixels in the horizontal direction within the block, and the difference value therebetween is calculated. This operation is repeated a number of times equal to the number of horizontal lines, that is, 50 times. Then, in step S803, the maximum difference value among 50 difference values is determined. In step S804, the maximum difference value is compared with a preset Tx. If the maximum difference value is smaller than the threshold value Tx, the block is regarded as a block having no feature value in the horizontal direction, and the block is determined to be an ineffective block in step S805. If the block can be regarded as having a feature value in the horizontal direction, similar verification is performed in the vertical direction. First, in step S806, a difference value between a maximum value and a minimum value for one vertical line within the block is calculated. That is, a maximum value and a minimum value are determined from 50 pixels in the vertical direction within the block, and the difference value therebetween is calculated. This operation is repeated a number of times equal to the number of vertical lines, that is, 50 times. Then, in step S808, the maximum difference value among 50 difference values is determined. In step S809, the maximum difference value is compared with a preset Ty. If the maximum difference value is smaller than the threshold value Ty, the block is regarded as a block having no feature value in the vertical direction, and the block is determined to be an ineffective block in step S805. If the block is a block having features in both the horizontal and vertical directions, it can be expected that accurate block matching be performed. Thus, in step S810, the block is determined to be an effective block.

Figure 9:
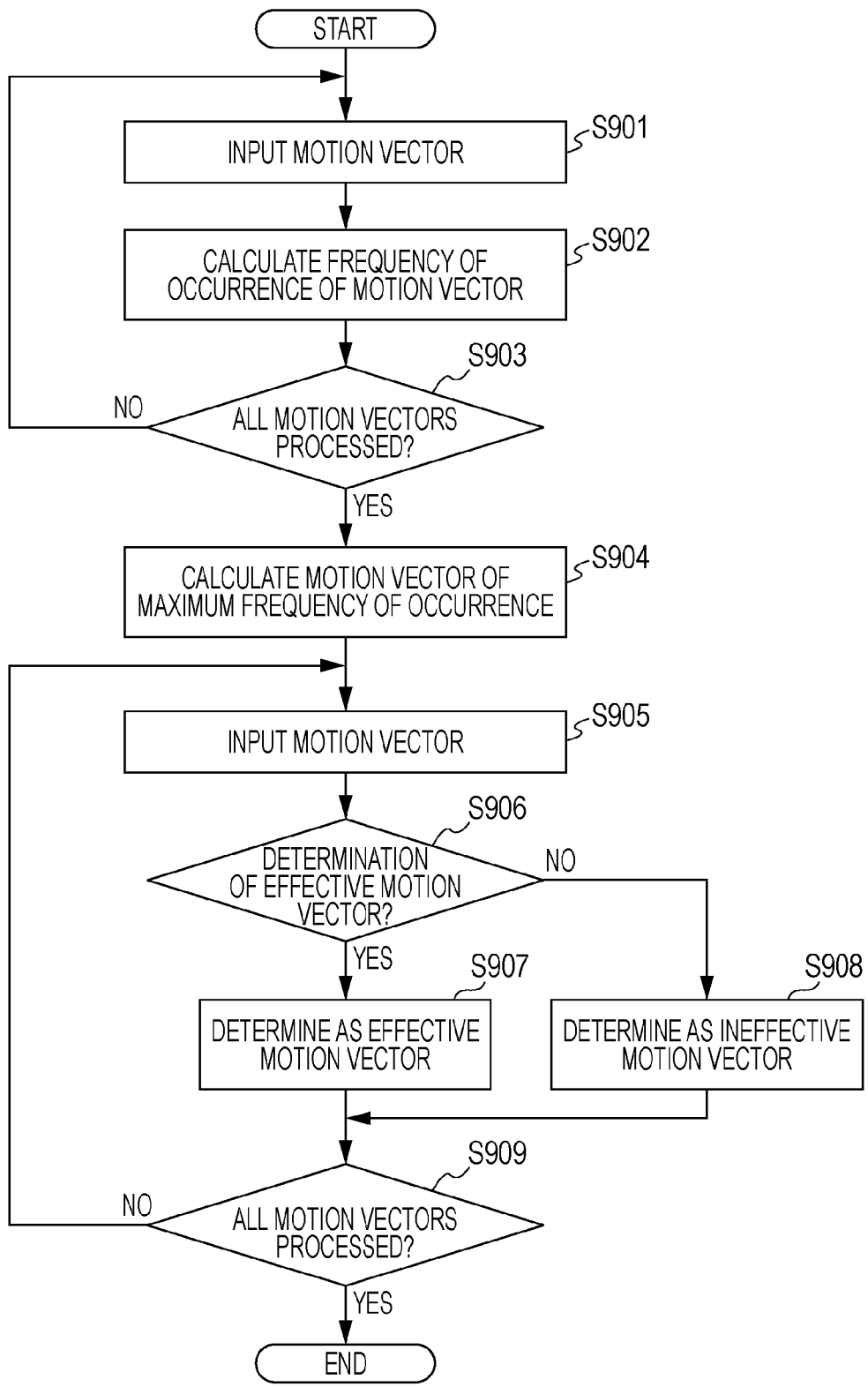
FIG. 9 is a flowchart describing an effective motion vector determination method.

Next, the effective motion vector determination method will be described using a flowchart of FIG. 9. First, in step S901, a motion vector is received as an input. In step S902, the frequency of occurrence of the motion vector is calculated. In step S903, this processing is repeatedly performed until the frequencies of occurrence of all motion vectors have been determined. When the processing is completed, in step S904, the motion vector having the maximum frequency of occurrence is determined. Then, in step S905, a motion vector is received as an input again. In step S906, it is determined whether or not this motion vector is the motion vector having the maximum frequency of occurrence or a motion vector in vicinity thereof. When blurring over the entire screen includes only shift blurring, motion vectors in each block should substantially coincide with the motion vector having the maximum frequency of occurrence. When roll blurring is involved, it is conceived that many motion vectors occur in the vicinity of the motion vector having the maximum frequency of occurrence. Therefore, it is determined in step S907 that motion vectors included in the above values are effective motion vectors, and it is determined in step S908 that motion vectors out of the above values are ineffective motion vectors. In step S909, it is determined whether or not the process has been completed for all the motion vectors, and the processing from step S905 is repeatedly performed until the process has been completed.

A relative movement amount is determined based on the average value of all the effective motion vectors. Further, a relative movement amount may not necessarily be determined based on simple average but may also be determined based on weighted average or the like.

In Exemplary Embodiment 1, as illustrated in FIG. 5, six input LR images $Y_k$ are used. However, the exemplary embodiment is not limited thereto. Two, three, ten, or any other number of LR images may be used to achieve the object of Exemplary Embodiment 1.

Further, in Exemplary Embodiment 1, termination determination of the loop process is performed based on the number of times the loop processing has been performed. However, the criterion for determining the termination processing is not limited to this method. Termination determination of the loop process may be performed based on the size of the evaluation function given in (Math. 3) or the magnitude of the update amount given in (Math. 6) to achieve the object of the exemplary embodiment 1. For example, the following conditions of termination determination may be used.

(1) In a case where an evaluation function is used: a threshold value th2 is used, and if I<th2, termination is obtained.

(2) In a case where an update amount is used: a threshold value th3 is used, and if ‖ΔX‖≤th3, termination is obtained.

Further, in Exemplary Embodiment 1, the sum of squares of the difference images between LR images and degraded images is used as an evaluation value ek. However, the evaluation value is not limited thereto. It is to be understood that the (A) mean sum of squares, the (B) absolute value of the difference image, or the like may also be used to achieve the object of the exemplary embodiment 1.

Figure 10:
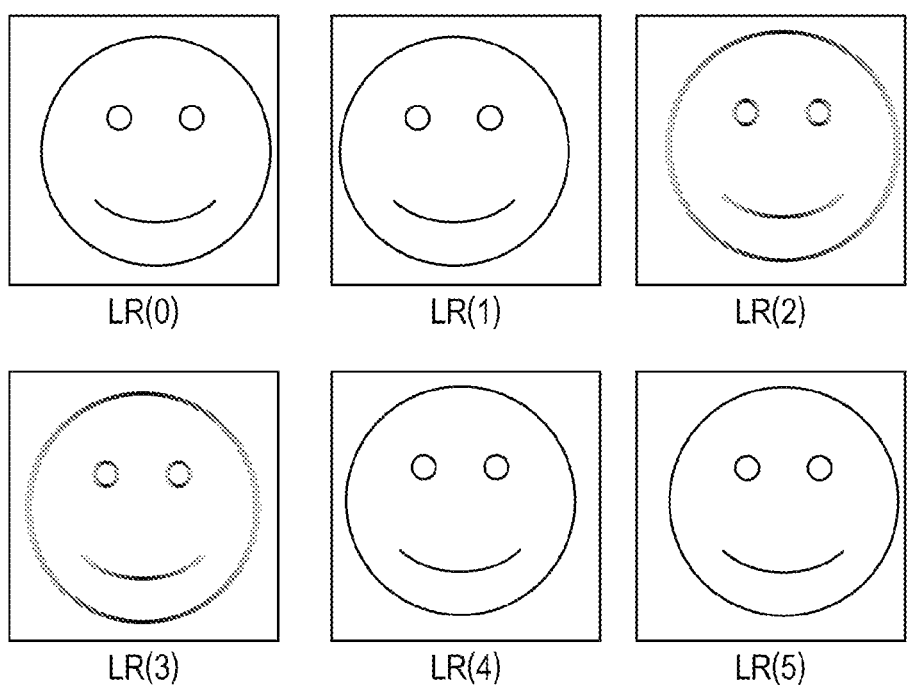
FIG. 10 is a diagram illustrating a plurality of input images including blurred images.

(A) In the case the mean sum of squares:

$$e_k = \frac{\|Y_k - Y'_k\|^2}{L},$$

where L is the number of pixels of an image Y (B) In the case of the absolute value of the difference image: $e_k = \|Y_k - Y'_k\|$ Further, in Exemplary Embodiment 1, the description has been given by focusing on changes in expression. However, as illustrated in FIG. 10, even when input images include a blurred image caused by camera shake or the like, processing can be performed in a similar manner. In FIG. 10, LR(2) and LR(3) are blurred images. Under the condition where an LR image other than LR(2) and LR(3) is selected as the initial HR image X0, the same process as the process illustrated in FIG. 4 is performed. Since blurring in LR(2) and LR(3) is different from blurring caused in the degradation stage by the PSF of the image capture device, the corresponding evaluation values ek are large, and LR(2) and LR(3) are not used in the HR image generation stage. Further, even if the relative movement amount calculation unit 108 has failed to calculate a relative movement amount (for example, if a feature value in an image has been erroneously detected), processing can be performed in a similar manner. That is, when a relative movement amount is incorrectly calculated, the value of the evaluation value ek is large. Thus, the generation of a degraded image $Y_k$ or an HR image X based on the incorrectly calculated relative movement amount can be prevented.

Further, in Exemplary Embodiment 1, a high-resolution image is generated using a MAP method. However, any other high-resolution image generation technique including a loop process may be used. For example, the POCS method, the POCS-ML method, the Back Projection method, or the like may be used.

In Exemplary Embodiment 1, a processing method for increasing the resolution of an image before and after the image combining process has been described. However, the case where the resolution of image frames may be reduced or may be maintained unchanged before and after the image combining process. The reduction of resolution may be made feasible by replacing the down-sampling factor, which is one item in the degradation conditions during image combining and which is defined by the image capture characteristic holding unit 205 in FIG. 2, by the up-sampling factor and by setting the current image magnification factors to (sx, sy). In this regard, sx and sy are assumed to be positive numbers. Further, making the resolution unchanged may be made feasible by setting the magnification factors to (1, 1).

As described above, according to Exemplary Embodiment 1, it is possible to specify low-resolution images contributing to the quality of a high-resolution image by using evaluation values based on the difference between a plurality of input LR images and degraded images generated based on the LR images in accordance with the image capture characteristics or relative movement amounts. Further, it is an object to generate an appropriate high-resolution image even when a registration between some of the low-resolution images has failed (when an inappropriate relative movement amount is calculated).

Then, images are combined only using specified low-resolution images or by applying a weight to only a specified low-resolution image. Therefore, it is possible to prevent a generated high-resolution image from blurring.

(Exemplary Embodiment 2)

In Exemplary Embodiment 1, the image combining process is implemented using a method including a loop process, such as MAP estimation. Exemplary Embodiment 2 is configured to generate a high-resolution image using an interpolation process after position correction between a plurality of images.

Figure 11:
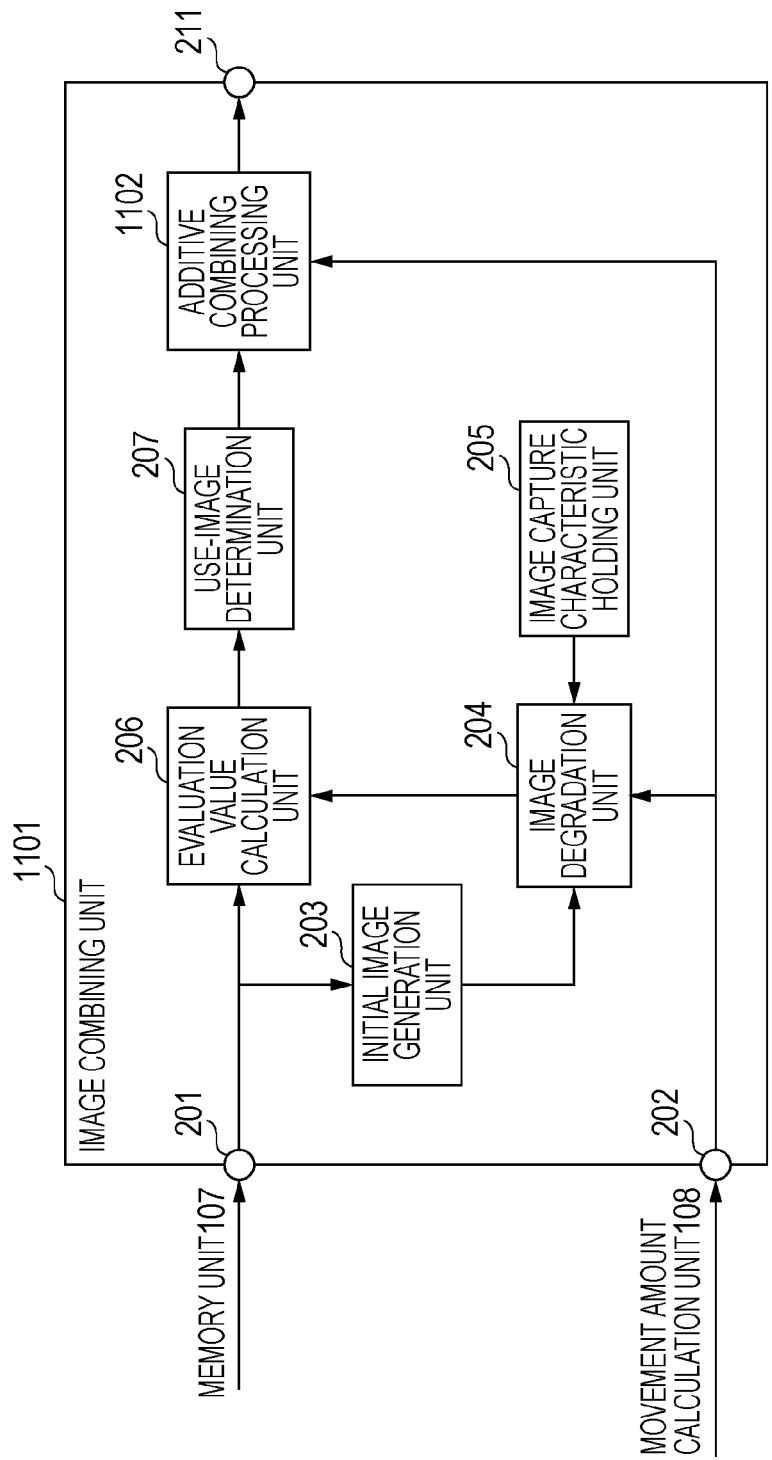
FIG. 11 is a block diagram illustrating an image combining unit included in the configuration of an image processing apparatus of Exemplary Embodiment 2.

The configuration of an image processing apparatus according to Exemplary Embodiment 2 is different from that of the image processing apparatus illustrated in FIG. 1 in terms of the image combining unit 109. FIG. 11 is a block diagram illustrating an image combining unit 1101 according to Exemplary Embodiment 2. As compared with the block diagram of the image combining unit 109 illustrated in FIG. 2, Exemplary Embodiment 2 has, in particular, the following differences:

(1) In Exemplary Embodiment 2, an additive combining processing unit 1102 that corrects a relative position between images to perform an additive combining process is additionally provided.

(2) In Exemplary Embodiment 2, the initial image generation unit 203 and the image modification unit 209 are not present.

Unlike Exemplary Embodiment 1, a high-resolution image generation method according to Exemplary Embodiment 2 does not require a loop process. Thus, the termination determination unit 210 is not included in the configuration.

The process of Exemplary Embodiment 2 will be described using FIG. 11. A plurality of LR images are input from a memory unit 107 through an image input terminal 201. Then, an initial image generation unit 203 generates an initial image for one LR image selected from among the plurality of input LR images. An image degradation unit 204 generates degraded images by applying relative movement amounts obtained from a relative movement amount input terminal 202 and image capture characteristics held in an image capture characteristic holding unit 205 to the initial image in accordance with (Math. 5). As in Exemplary Embodiment 1, an evaluation value calculation unit 206 calculates an evaluation value for each degraded image. A use-image determination unit 207 selects LR images on which the subsequent additive combining process is to be performed on the basis of the determined evaluation values. The additive combining processing unit 1102 performs a registration between all the LR images on the basis of the selected LR images and affine parameters which are the relative movement amounts. Then, image combining is performed on LR images between which a registration has been completed. Image combining is implemented by an interpolation process.

In this combining process, first, an interpolation process is performed using a wide-band low-pass filter that allows all the high-frequency components including aliased components to pass therethrough to resample the degraded images. The resampled images are additively combined while relative movement amounts between the images are taken into consideration. Therefore, high-resolution images in which the aliased components have been canceled during sampling are generated.

As in Exemplary Embodiment 1, Exemplary Embodiment 2 has a feature in that appropriate low-resolution images are selected before image combining is performed. That is, according to Exemplary Embodiment 2, evaluation values are calculated based on relative movement amounts and image capture characteristics. Then, low-resolution images contributing to the quality of a high-resolution image are specified in accordance with the calculated evaluation values, and it is possible to generate an appropriate high-resolution image.

This can avoid blurring of the high-resolution image which is caused by unnecessary low-resolution images.

Further, Exemplary Embodiment 2 does not require repetitive computation, and therefore can allow for acquisition of a high-resolution image while reducing computation cost.

(Exemplary Embodiment 3)

In Exemplary Embodiment 1, input images are selected based on evaluation values ek. Exemplary Embodiment 3 is configured to calculate weight values for a plurality of input images on the basis of evaluation values and to combine the plurality of images while taking the weight values into consideration to generate a high-resolution image.

Figure 12:
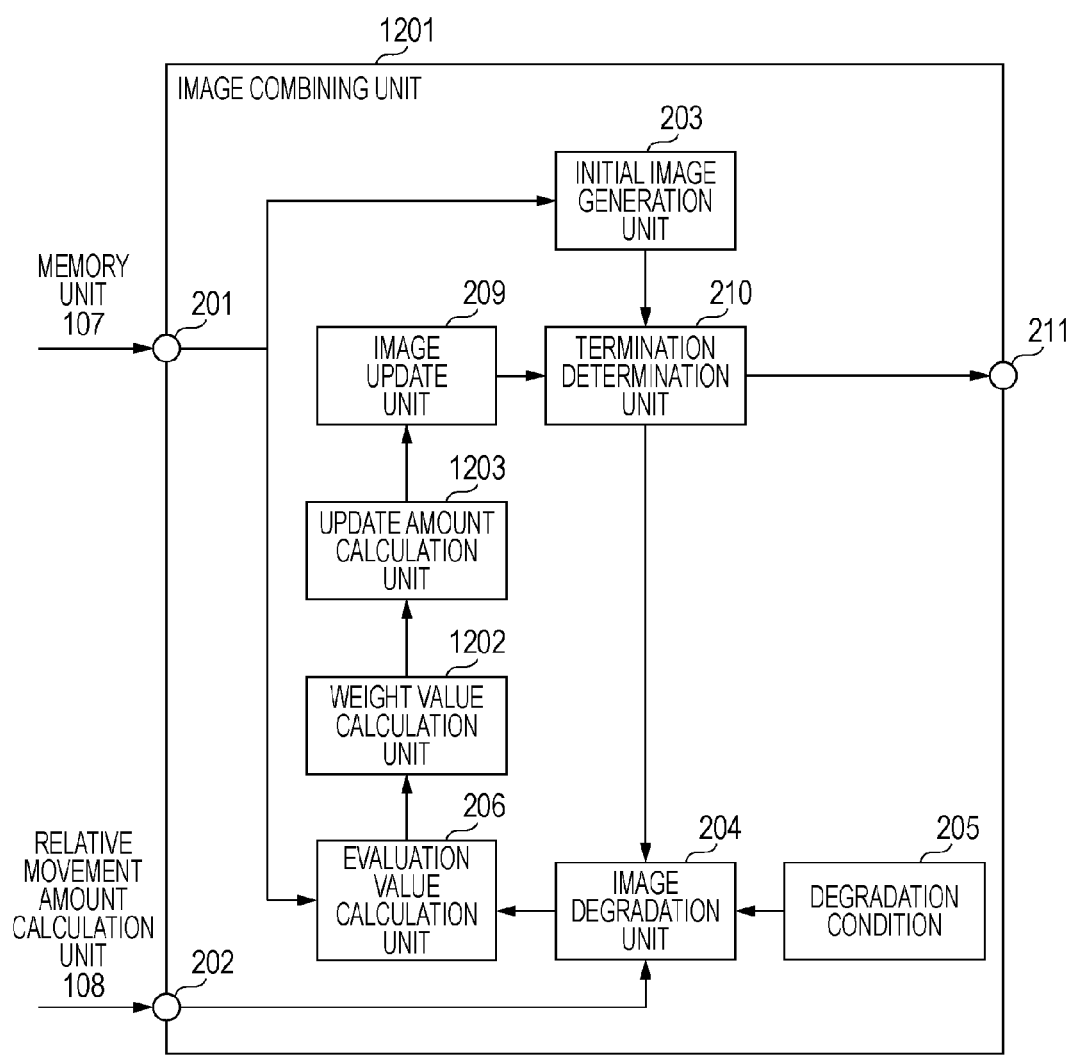
FIG. 12 is a block diagram illustrating an image combining unit included in the configuration of an image processing apparatus of Exemplary Embodiment 3.

The configuration of an image processing apparatus according to Exemplary Embodiment 3 is different from that of the image processing apparatus illustrated in FIG. 1 in terms of the image combining unit 109. FIG. 12 is a block diagram illustrating an image combining unit 1201 according to Exemplary Embodiment 3. As compared with the block diagram of the image combining unit 109 illustrated in FIG. 2, a weight value calculation unit 1202 that calculates a weight of each of the input images is additionally provided in place of the use-image determination unit 207, and the update amount calculation unit 208 is replaced by a update value calculation unit 1203. The calculation of a weight value is performed based on an evaluation value, and the larger the evaluation value is, the smaller the weight is. For example, a method in which a value obtained by normalizing the inverse of an evaluation value ek with the number of images to be used in the image combining process is used as a weight value wk may be used. Specifically, the expression as given in (Math. 15) is obtained.

$$w_k = \frac{1}{e_k \cdot E} \quad \text{(Math. 15)}$$

where E denotes the constant used for normalization.

The weight values calculated by the weight value calculation unit are used subsequently when the modification value calculation unit 1203 calculates modification values. When an LR image $Y_k$ has a weight wk, specifically, a modification value $\Delta X$ is computed as given in (Math. 16).

$$\Delta X = \frac{\partial I}{\partial X} \quad \text{(Math. 16)}$$
$$= 2\alpha C^T C X - \sum_k w_k \frac{2}{\sigma_k^2} (DB_k M_k)^T [Y_k - DB_k M_k X]$$

An image modification unit 209 corrects an HR image using the calculated modification value $\Delta X$.

As described above, according to Exemplary Embodiment 3, weight values wk of respective input LR images $Y_k$ used for image combining are calculated based on evaluation values, and an image combining process is performed. Since the weight values wk indicate the proportion of contribution to the quality of a high-resolution image, control can be performed so that a large weight is set for an LR image contributing to the quality while a small weight is set for an LR image otherwise. This control enables generation of an appropriate high-resolution image.

(Exemplary Embodiment 4)

In Exemplary Embodiment 2, input images are selected based on evaluation values. Exemplary Embodiment 4 is configured to calculate weight values for a plurality of input images on the basis of evaluation values and to additively combine the plurality of images while taking the weight values into consideration to generate a high-resolution image.

Figure 13:
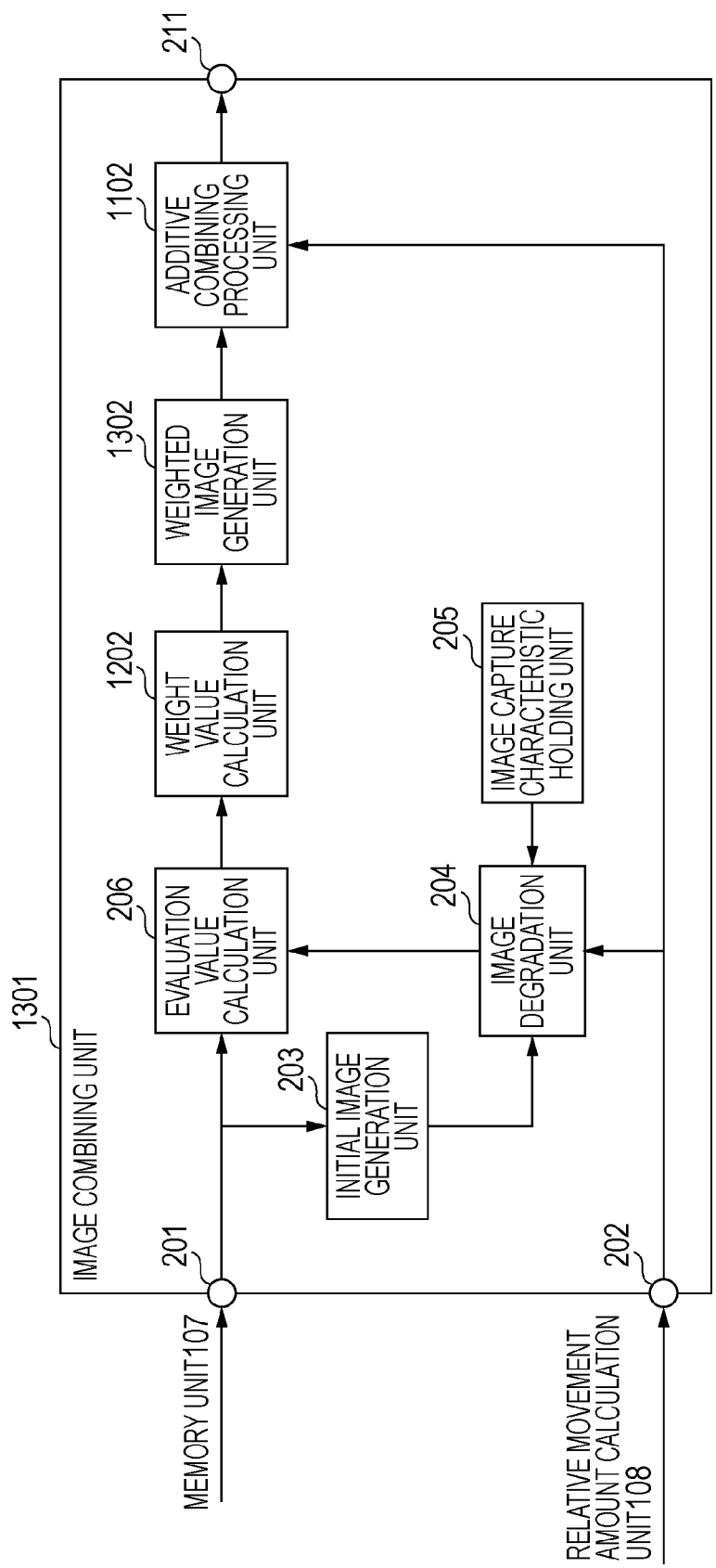
FIG. 13 is a block diagram illustrating an image combining unit included in the configuration of an image processing apparatus of Exemplary Embodiment 4.

The configuration of an image processing apparatus according to Exemplary Embodiment 4 is different from that of the image processing apparatus illustrated in FIG. 1 in terms of the image combining unit 109. FIG. 13 is a block diagram illustrating an image combining unit 1301 according to Exemplary Embodiment 4. As compared with the block diagram of the image combining unit 1101 illustrated in FIG. 11, a weight value calculation unit 1202 that calculates a weight of each input image, as described above, is additionally provided in place of the use-image determination unit 207, and further a weighted image generation unit 1302 is additionally provided. The weighted image generation unit 1302 generates weighted images for all the LR images on the basis of the weight values of the respective LR images calculated by the weight value calculation unit 1202. Specifically, a weighted image is generated by multiplying each LR image $Y_k$ by the weight value wk of each image. Thereafter, the additive combining unit 1102 performs a combining process using the weighted images to generate a high-resolution image.

As described above, there is a feature in that appropriate low-resolution images are selected before image combining is performed. That is, according to Exemplary Embodiment 4, evaluation values are calculated based on relative movement amounts and image capture characteristics. Then, low-resolution images contributing to the quality of a high-resolution image are specified in accordance with the calculated evaluation values, and a weighting process is performed, thus making it possible to generate an appropriate high-resolution image. This can avoid blurring of the high-resolution image which is caused by unnecessary low-resolution images. Further, Exemplary Embodiment 4 does not require repetitive computation, and can therefore allow for acquisition of a high-resolution image with reduced computation cost.

(Exemplary Embodiment 5)

In the foregoing exemplary embodiments, resolution conversion is performed on an entire input image. In the exemplary embodiment, the processing according to Exemplary Embodiments 1 to 4 may be performed on a region that is a portion of an image. Conceivable examples of the region that is a portion of an image include:

(1) A fixed region (for example, an upper right ¼ region in the image)

(2) An in-focus region (3) A region specified in face recognition, object recognition, or the like As described above, a resolution conversion process is performed only on a portion of an image, thus making it possible to obtain a high-resolution image while reducing computational load.

(Exemplary Embodiment 6)

A storage medium having recorded thereon a program code of software that implements the functions of the foregoing exemplary embodiments (for example, the functions illustrated in the flowcharts of FIGS. 4, 7, 8, and 9) may also be supplied to a system or an apparatus to provide an implementation. In this case, a computer in the system or the apparatus reads and executes the program code stored in the storage medium in a computer-readable manner, thereby implementing the functions of the foregoing exemplary embodiments.

The present invention has advantageous effects in that when a high-resolution image is generated by combining a plurality of input low-resolution images, difficulties caused by images unsuitable for the combining process, which are included in the plurality of low-resolution image, such as image blur, can be eliminated or reduced to generate an appropriate high-resolution image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Application No. PCT/JP2009/064716, filed Aug. 24, 2009, which is hereby incorporated by reference herein in its entirety.

The invention claimed is:

1. An image processing apparatus that generates a second image having a second resolution using a plurality of first images having a first resolution, the first images being captured using an image capture device, the image processing apparatus comprising:
- a first acquiring unit configured to acquire a relative movement amount between a reference image selected from the plurality of first images and each of the plurality of first images;
- a first generating unit configured to generate a fourth image having the first resolution for each of the plurality of first images in accordance with the relative movement amount corresponding to each of the plurality of first images, a third image having the second resolution, and image capture characteristics of the image capture device;
- a second acquiring unit configured to acquire an evaluation value based on a difference between each of the plurality of fourth images generated by the first generating unit and the first image corresponding to each of the plurality of fourth images; and
- a second generating unit configured to generate the second image having the second resolution by updating the third image using an update value that is determined using the plurality of fourth images in accordance with the plurality of evaluation values acquired by the second acquiring unit,
- wherein the second generating unit determines the update value using weights based on the plurality of evaluation values acquired by the second acquiring unit.

2. The image processing apparatus according to claim 1, further comprising an updating unit configured to update the second image generated by the second generating unit as the third image,
- wherein the first generating unit generates the plurality of fourth images each having the first resolution for the respective first images in accordance with the third image updated by the updating unit, the plurality of relative movement amounts acquired by the first acquiring unit, and the image capture characteristics of the image capture device.

3. The image processing apparatus according to claim 2, wherein the initial third image is acquired by performing an interpolation process on one first image selected from among the plurality of first images.

4. The image processing apparatus according to claim 2, wherein the updating unit updates the second image as the third image until a set condition is satisfied.

5. The image processing apparatus according to claim 4, wherein the set condition is the number of times updating has been performed by the updating unit.

6. The image processing apparatus according to claim 1, wherein the second generating unit selects some of the plurality of fourth images in accordance with the plurality of evaluation values acquired by the second acquiring unit, determines the update value using only the selected images as the plurality of fourth images, and generates the second image.

7. The image processing apparatus according to claim 1, wherein the image capture characteristics of the image capture device are a point spread function of the image capture device, and a down-sampling factor from the second resolution to the first resolution.

8. An image processing method for generating a second image having a second resolution using a plurality of first images having a first resolution, the first images being captured using an image capture device, the image processing method comprising:
- a first acquiring step of acquiring a relative movement amount between a reference image selected from the plurality of first images and each of the plurality of first images;
- a first generating step of generating a fourth image having the first resolution for each of the plurality of first images in accordance with the relative movement amount corresponding to each of the plurality of first images, a third image having the second resolution, and image capture characteristics of the image capture device;
- a second acquiring step of acquiring an evaluation value based on a difference between each of the plurality of fourth images generated in the first generating step and the first image corresponding to each of the plurality of fourth images; and
- a second generating step of generating the second image having the second resolution by updating the third image using an update value that is determined using the plurality of fourth images in accordance with the plurality of evaluation values acquired in the second acquiring step,
- wherein the second generating step determines the update value using weights based on the plurality of evaluation values acquired by the second acquiring step.

9. A non-transitory computer-readable medium having stored thereon a program for causing an image processing apparatus to perform an image processing method comprising:
- a first acquiring step of acquiring a relative movement amount between a reference image selected from the plurality of first images and each of the plurality of first images;
- a first generating step of generating a fourth image having the first resolution for each of the plurality of first images in accordance with the relative movement amount corresponding to each of the plurality of first images, a third image having the second resolution, and image capture characteristics of the image capture device;
- a second acquiring step of acquiring an evaluation value based on a difference between each of the plurality of fourth images generated in the first generating step and the first image corresponding to each of the plurality of fourth images; and
- a second generating step of generating the second image having the second resolution by updating the third image using an update value that is determined using the plurality of fourth images in accordance with the plurality of evaluation values acquired in the second acquiring step,
wherein the second generating step determines the update value using weights based on the plurality of evaluation values acquired by the second acquiring step.

* * * * *